(12) United States Patent
Tseng et al.

(10) Patent No.: US 11,067,125 B2
(45) Date of Patent: Jul. 20, 2021

(54) LUBRICATING TUBE AND SLIDE RAIL DEVICE HAVING SAME

(71) Applicant: TOYO AUTOMATION CO., LTD., Tainan (TW)

(72) Inventors: Kun-Cheng Tseng, Tainan (TW); Hsiang-Wei Chen, Tainan (TW); Chung-Ju Chen, Tainan (TW)

(73) Assignee: TOYO AUTOMATION CO., LTD., Tainan (TW)

( * ) Notice: Subject to any disclaimer, the term of this patent is extended or adjusted under 35 U.S.C. 154(b) by 0 days.

(21) Appl. No.: 16/749,379

(22) Filed: Jan. 22, 2020

(65) Prior Publication Data
US 2021/0095718 A1 Apr. 1, 2021

(30) Foreign Application Priority Data
Oct. 1, 2019 (TW) ................. 108135547

(51) Int. Cl.
*F16C 29/06* (2006.01)
*F16C 33/10* (2006.01)
*F16N 7/38* (2006.01)
*C08L 23/06* (2006.01)

(52) U.S. Cl.
CPC .......... *F16C 33/1025* (2013.01); *C08L 23/06* (2013.01); *F16C 29/0609* (2013.01); *F16C 29/0611* (2013.01); *F16N 7/385* (2013.01); *C08L 2203/30* (2013.01); *C08L 2207/062* (2013.01)

(58) Field of Classification Search
CPC ............. F16C 29/0609; F16C 29/0611; F16C 29/063; F16C 29/0657; F16C 33/1025; C08L 23/06; C08L 2203/30; C08L 2207/062; F16N 7/385; F16H 25/2204; F16H 2025/2034
USPC ........................................ 384/13, 43–45, 49
See application file for complete search history.

(56) References Cited

U.S. PATENT DOCUMENTS

| | | | | |
|---|---|---|---|---|
| 5,299,465 A | * | 4/1994 | Kasuga | F16C 29/063 384/45 |
| 6,071,210 A | * | 6/2000 | Kato | F16H 15/38 384/49 |
| 6,712,511 B2 | * | 3/2004 | Matsui | F16C 29/064 384/45 |
| 7,300,208 B2 | * | 11/2007 | Kuellstaedt | F16C 29/005 384/43 |

(Continued)

FOREIGN PATENT DOCUMENTS

| | | | | |
|---|---|---|---|---|
| EP | 1236913 | A1 * | 9/2002 | ......... F16C 29/0695 |
| JP | 2017089772 | A * | 5/2017 | ............ F16C 19/502 |

*Primary Examiner* — Marcus Charles
(74) *Attorney, Agent, or Firm* — J.A. Lindeman & Co., PLLC (57) ABSTRACT

A lubricating tube includes an inner surrounding surface that has a non-circular cross-section, angularly spaced-apart inner lubricant-storing recesses, and guide surface portions each of which is interconnected between two adjacent ones of the inner lubricant-storing recesses. The inner lubricant-storing recesses and the guide surface portions constitute the inner surrounding surface and cooperatively define a roller passage hole. The inner lubricant-storing recesses are indented from the guide surface portions toward the outer surrounding surface. A slide rail device having the lubricating tube is also disclosed.

8 Claims, 6 Drawing Sheets

(56) References Cited

U.S. PATENT DOCUMENTS

| | | | | |
|---|---|---|---|---|
| 7,467,895 B2* | 12/2008 | Kurachi | ............... | F16C 29/065 |
| | | | | 384/43 |
| 8,118,491 B2* | 2/2012 | Menges | ............... | F16C 29/065 |
| | | | | 384/51 |
| 8,313,239 B2* | 11/2012 | Ju | ........................ | B23Q 1/30 |
| | | | | 384/45 |
| 8,430,568 B2* | 4/2013 | Pfister | .................. | F16C 29/064 |
| | | | | 384/45 |
| 8,858,082 B2* | 10/2014 | Hsu | .................... | F16C 29/0645 |
| | | | | 384/43 |
| 9,163,665 B2* | 10/2015 | Liao | ................... | F16C 29/0609 |
| 2006/0159373 A1* | 7/2006 | Matsumoto | ......... | F16C 29/0647 |
| | | | | 384/45 |

* cited by examiner

LUBRICATING TUBE AND SLIDE RAIL DEVICE HAVING SAME

CROSS-REFERENCE TO RELATED APPLICATION

This application claims priority to Taiwanese Patent Application No. 108135547, filed on Oct. 1, 2019.

FIELD

The disclosure relates to a slide rail device, and more particularly to a slide rail device that includes lubricating tubes.

BACKGROUND

A conventional slide rail device includes a track member, a slider, two pairs of circulating devices, and two roller units circulable through the track member, the slider and the circulating devices. The slider is slidably disposed on the track member to connect and position a carrier. When a drive module drives the slider to slide on the track member, a working mechanism disposed on the carrier is moved.

When a lubricant oil is introduced into the slider, the lubricant oil flows to lubricate the roller units respectively received in two circulating circuits of the conventional slide rail device. However, in use, because the lubricant oil cannot be continuously retained in the slider for a long period, it has to be frequently supplied and maintained to ensure lubrication of the roller units and to extend the lifetime of the slider. Therefore, it is one of important concerns that the slider can store the lubricant oil sufficiently and provide good lubrication function so as to reduce maintenance frequency and to enhance operation efficiencies.

Hence, to lubricate the track member and the roller unit, lubricant retention members have been hitherto disposed within a slider to store and release a lubricant oil.

For example, lubricant retention members, as disclosed in JP Patent Application No. 200141304, are made of a lubricant-containing polymer material and are porous to store and release the lubricant oil to the roller unit. Further, clearances formed between the slider and the roller units may serve as a space to store the lubricant oil. However, as the clearances are designed to only allow circulation of the roller unit, storability of the lubricant oil is limited.

Likewise, there are other patents, such as JP Patent Nos. 3733654, 3950540, 4502290 or 6196128, which disclose use of lubricant-containing polymer materials for lubrication purposes. However, storability of the lubricant oil is limited and is incapable of retaining the lubricant oil for a long period. The lubricant oil has to be frequently supplied and maintained, thereby causing inconvenience.

SUMMARY

Therefore, an object of the disclosure is to provide a lubricating tube that can alleviate at least one of the drawbacks of the prior art.

Accordingly, the lubricating tube of the disclosure includes a tubular lubricant body made of a porous material and defining an axis. The tubular lubricant body includes an inner surrounding surface surrounding the axis, and an outer surrounding surface surrounding the inner surrounding surface. The inner surrounding surface has a non-circular cross-section perpendicular to the axis, a plurality of angularly spaced-apart inner lubricant-storing recesses disposed around the axis and extending axially, and a plurality of guide surface portions each of which is interconnected between two adjacent ones of the inner lubricant-storing recesses. The inner lubricant-storing recesses and the guide surface portions constitute the inner surrounding surface and cooperatively define a first roller passage hole. The inner lubricant-storing recesses are indented from the guide surface portions toward the outer surrounding surface.

Another object of the disclosure is to provide a slide rail device that provides a solution to the problems encountered in the prior art.

Accordingly, a slide rail device of the disclosure includes a track member, a slider, two tubular lubricant bodies, two pairs of circulating devices, and two roller units. The track member extends along a longitudinal line, and has two side walls opposite to each other along a transverse line transverse to the longitudinal line and two outer passage halves respectively indented into the side walls, and extending along the longitudinal line. The slider is slidably disposed on the track member between the side walls, and includes two end faces opposite to each other along the longitudinal line, two tube-receiving channels extending through the end faces along the longitudinal line, a lubricant-filling channel fluidly communicating with the tube-receiving channels, and two inner passage halves respectively confronting the outer passage halves to form second roller passage holes. Each of the inner passage halves is disposed between one of the tube-receiving channels and one of the outer passage halves. The tubular lubricant bodies are made of a porous material, each define an axis parallel with the longitudinal line and are respectively disposed within the tube receiving-channels. The circulating devices are connected to the slider.

Each of the tubular lubricant bodies includes an inner surrounding surface surrounding the axis, and an outer surrounding surface surrounding the inner surrounding surface.

The inner surrounding surface has a non-circular cross-section perpendicular to the axis, a plurality of angularly spaced-apart inner lubricant-storing recesses disposed around the axis and extending axially, and a plurality of guide surface portions each of which is interconnected between two adjacent ones of the inner lubricant-storing recesses.

The inner lubricant-storing recesses and the guide surface portions constitute the inner surrounding surface and cooperatively define a first roller passage hole.

The inner lubricant-storing recesses are indented from the guide surface portions toward the outer surrounding surface.

Each of the circulating devices includes a circulating hole communicating with one of the second roller passage hole and the first roller passage hole of one of the tubular lubricant bodies. The circulating devices of each pair are opposite to each other along the longitudinal line and cooperate with one of the tubular lubricant bodies and one of the second roller passage holes to define a circulating circuit.

The circulating circuit receives one of the roller units.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
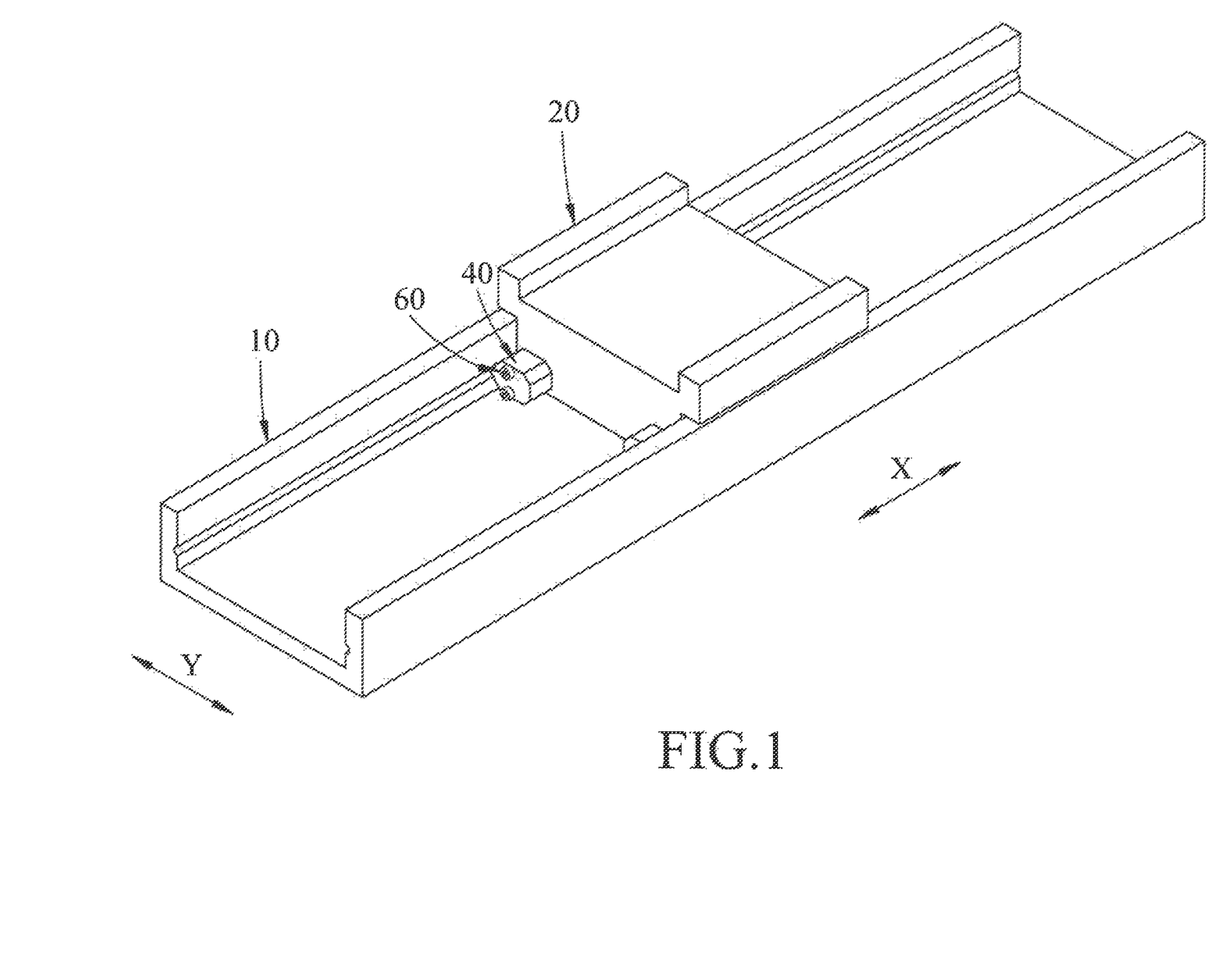
FIG. 1 is a perspective view of a slide rail device according to an embodiment of the disclosure.
Figure 2:
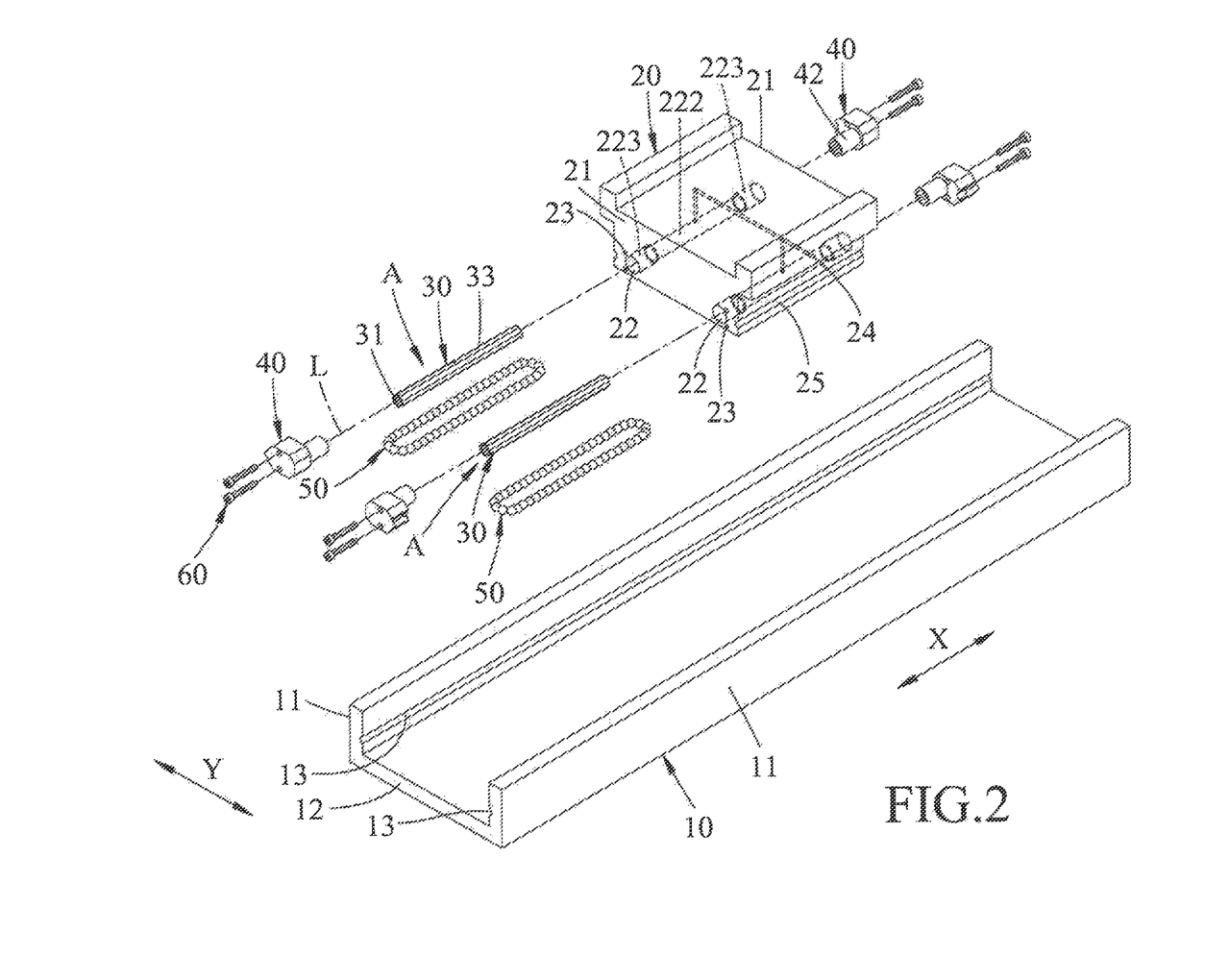
FIG. 2 is an exploded perspective view of the embodiment.

FIGS. 1 and 2 illustrate a slide rail device according to an embodiment of the disclosure. The slide rail device includes a track member 10, a slider 20, two lubricating tubes (A), two pairs of circulating devices 40, two roller units 50, and a plurality of screws 60.

The track member 10 extends along a longitudinal line (X), and has two side walls 11 opposite to each other along a transverse line (Y) transverse to the longitudinal line (X), a base wall 12 interconnects the side walls 11, and two outer passage halves 13 respectively indented into the side walls 11 and extending along the longitudinal line (X).

The slider 20 is slidably disposed on the track member 10 along the longitudinal line (X) and between the side walls 11. The slider 20 includes two end faces 21 opposite to each other along the longitudinal line (X), two tube-receiving channels 22 extending through the end faces 21 along the longitudinal line (X), a plurality of screw holes 23 formed on the end faces 21 proximately to the tube-receiving channels 22, a lubricant-filling channel 24 fluidly communicating with the tube-receiving channels 22, and two inner passage halves 25 respectively confronting the outer passage halves 13 to form second roller passage holes (S) (see FIG. 6). Each tube-receiving channel 22 has an intermediate section 222 extending along the longitudinal line (X), and two enlarged portions 223 enlarged from two opposite ends of the intermediate portion 222 and extending through the end faces 21 along the longitudinal line (X). Each of the inner passage halves 25 is disposed between one of the tube-receiving channels 22 and one of the outer passage halves 13.

Figure 3:
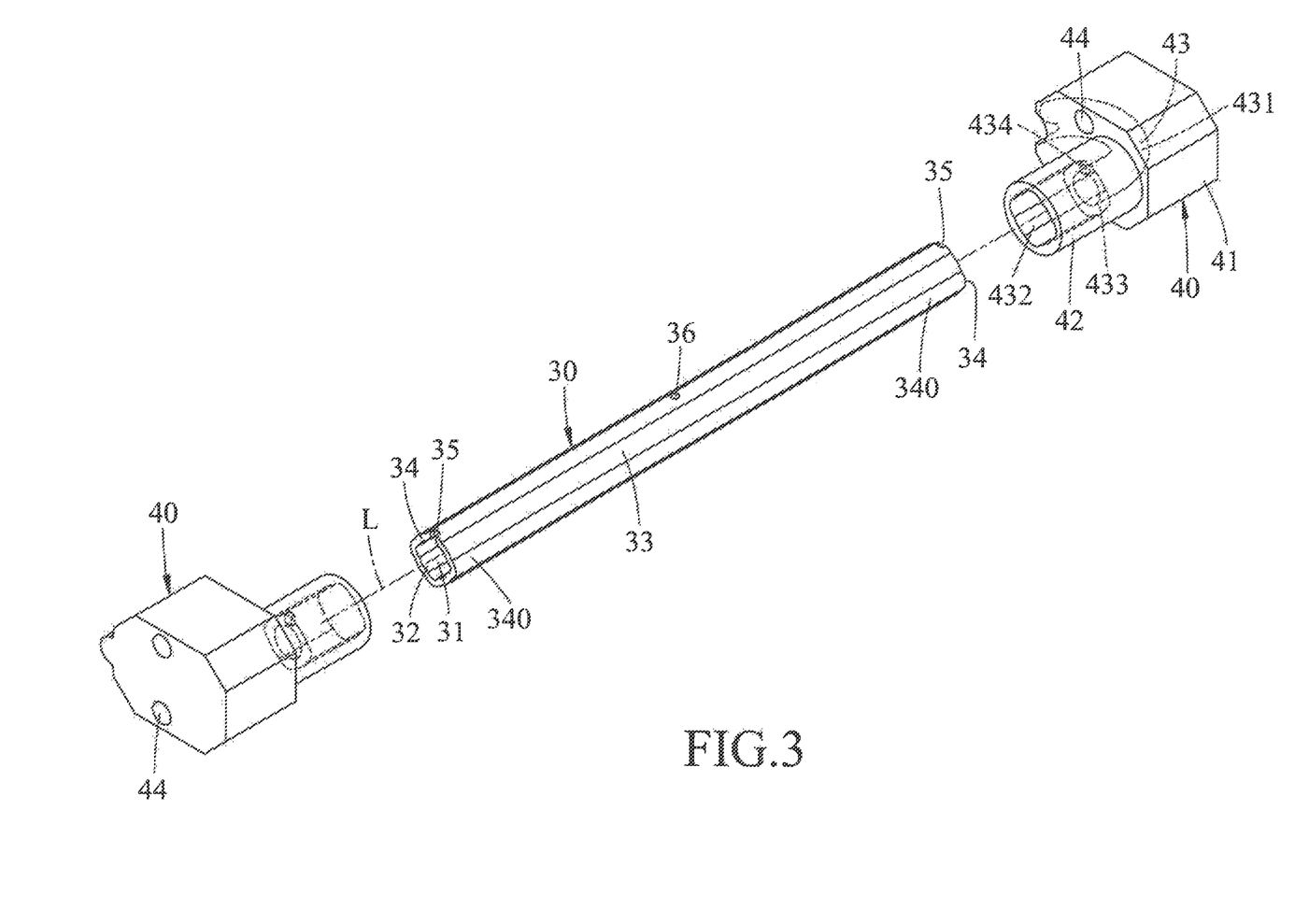
FIG. 3 is an exploded view of the embodiment illustrating a lubricating tube and a pair of circulating devices 40 of the slid rail device.
Figure 4:
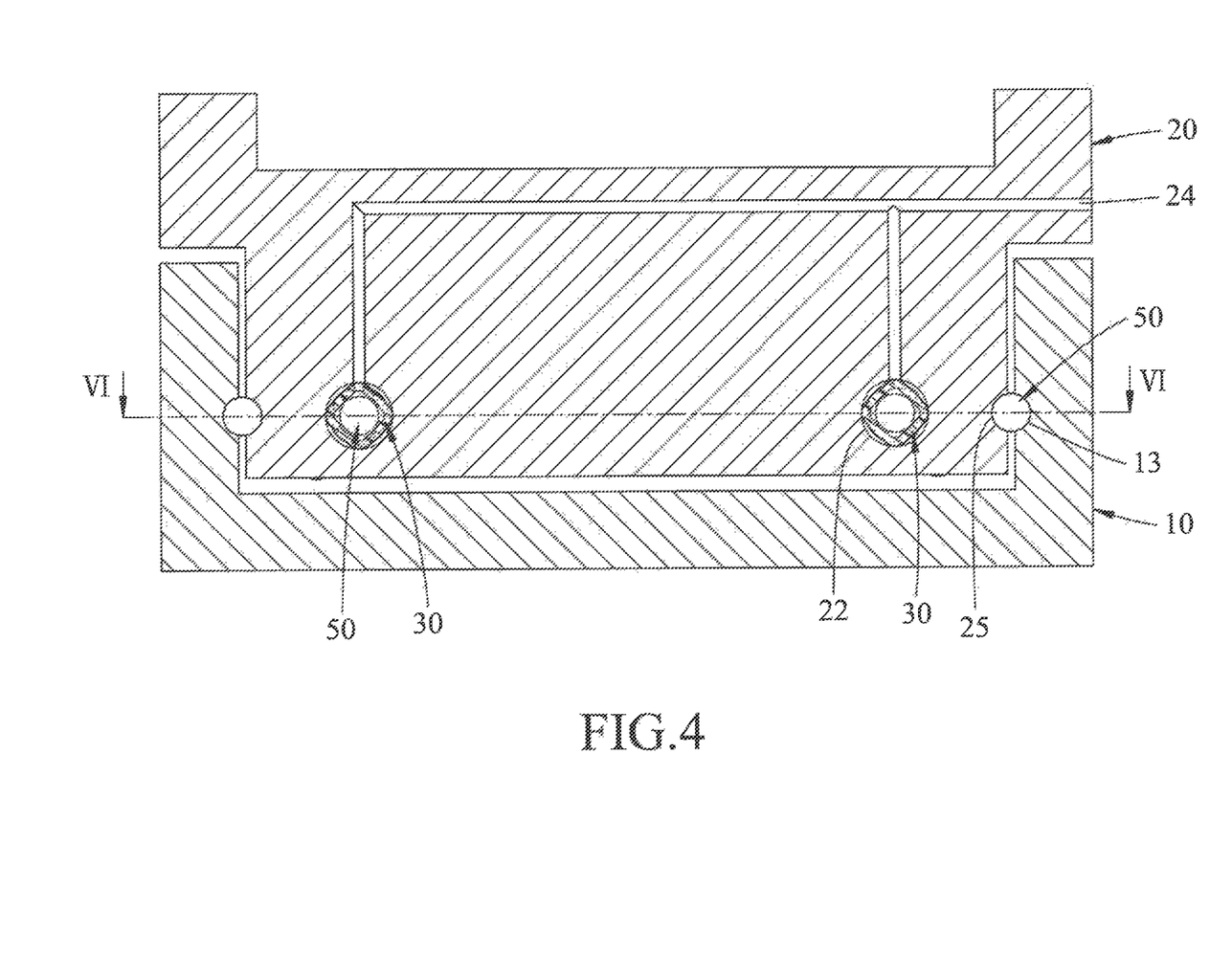
FIG. 4 is a sectional view of the embodiment.
Figure 5A:
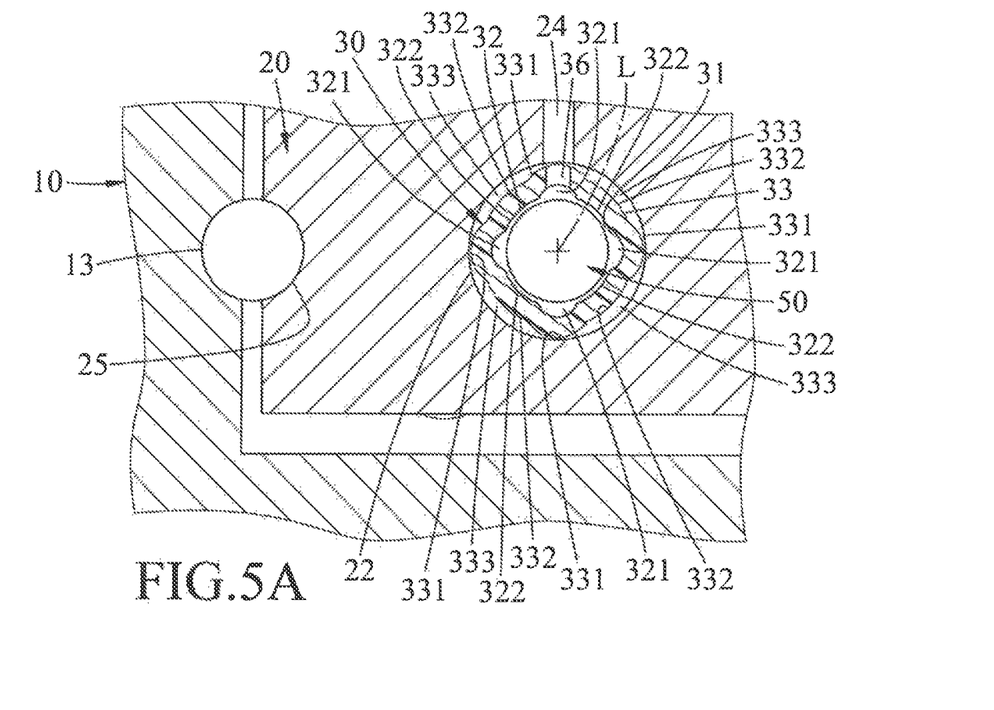
FIG. 5A is a partially enlarged sectional view of FIG. 4.
Figure 5B:
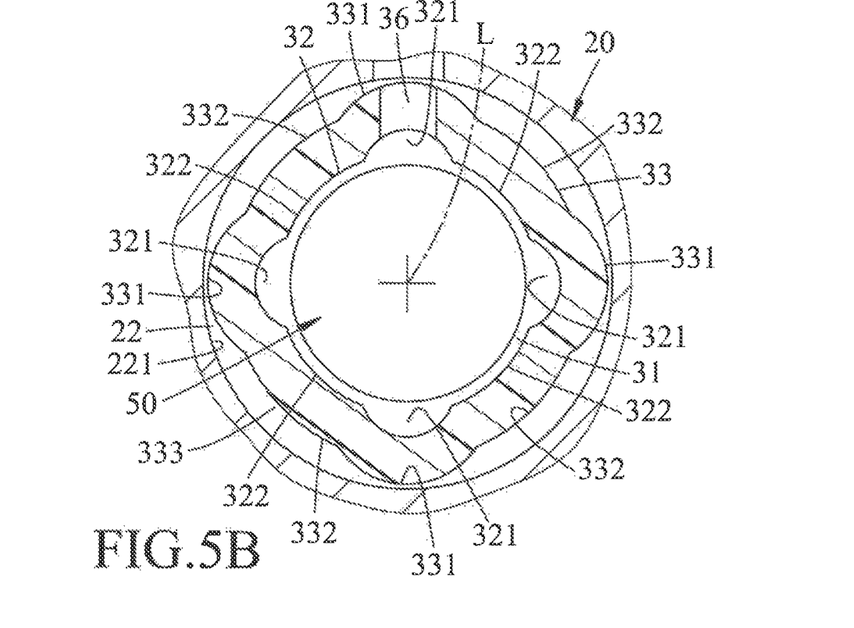
FIG. 5B is a partially enlarged view taken from FIG. 5A.

Referring to FIGS. 5A and 5B, each lubricating tube (A) has a tubular lubricant body 30 made of a porous material. In this embodiment, the tubular lubricant body 30 is thermoformed from a high density polyethylene material. The tubular lubricant bodies 30 are respectively disposed within the tube receiving-channels 22. Each tubular lubricant body 30 defines an axis (L) parallel with the longitudinal line (X) (see FIG. 2). Each tubular lubricant body 30 includes an inner surrounding surface 32 surrounding the axis (L), an outer surrounding surface 33 surrounding said inner surrounding surface 32, and a lubricant supply hole 36 extending through the inner and outer surrounding surfaces 32, 33 and communicating with the first roller passage hole 31. As shown in FIG. 3, each tubular lubricant body 30 further includes two axially opposite end portions 340 each having an end face 34 and an engagement recess 35 indented into the end face 34. Each of the inner and outer surrounding surfaces 32, 33 of each tubular lubricant body 30 has non-circular cross-section perpendicular to the axis (L). The inner surrounding surface 32 has a plurality of angularly spaced-apart inner lubricant-storing recesses 321 disposed around the axis (L) and extending axially, and a plurality of guide surface portions 322 each of which is interconnected between two adjacent ones of the inner lubricant-storing recesses 321. The inner lubricant-storing recesses 321 and the guide surface portions 322 constitute the inner surrounding surface 32 and cooperatively define a first roller passage hole 31. The inner lubricant-storing recesses 321 are indented from the guide surface portions 322 toward the outer surrounding surface 33. The outer surrounding surface 33 of each tubular lubricant body 30 has a plurality of angularly spaced-apart protrusion portions 331 disposed around the axial line (L) and extending axially, and a plurality of arcuate surface portions 332 each of which is interconnected between two adjacent ones of the protrusion portions 331. The protrusion portions 331 protrude outwardly from the arcuate surface portions 332. Each arcuate surface portion 332 and two adjacent ones of the protrusion portions 331 cooperatively define an outer lubricant-storing recess 333. The lubricant supply hole 36 extends from one of the protrusion portions 331 to one of the inner lubricant-storing recesses 321 that is radially opposite to the one of the protrusion portions 331. The lubricant supply hole 36 and the lubricant-filling channel 24 fluidly communicate with each other.

Figure 6:
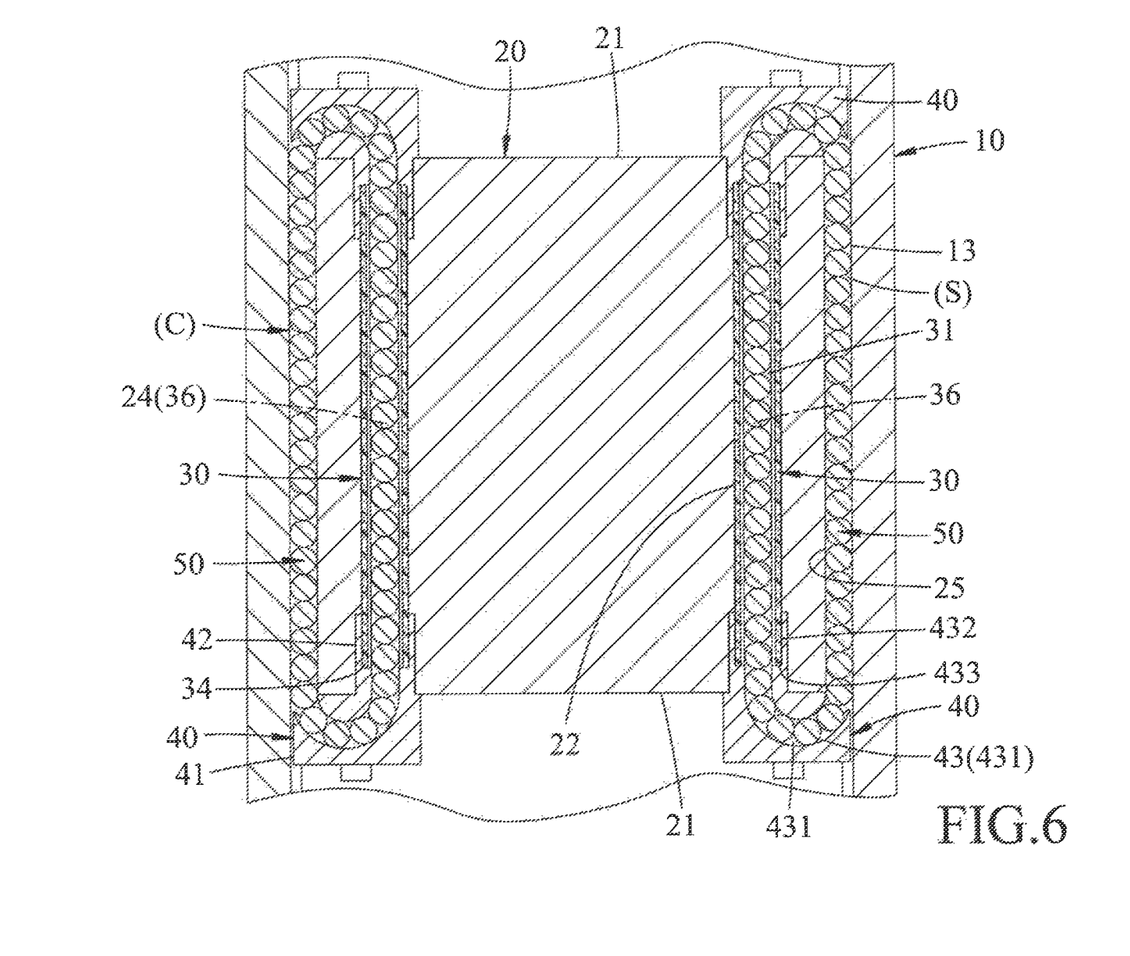
FIG. 6 is a fragmentary sectional view taken along line VI-VI of FIG. 4.

Referring to FIG. 6, in combination with FIGS. 2 and 3, the two pairs of the circulating devices 40 are connected to the slider 20. Each circulating device 40 includes a main body 41, a protruding tube 42 projecting outwardly from the main body 41, and a circulating hole 43 communicating with one of the second roller passage holes (S) and the first roller passage hole 31 of one of the tubular lubricant bodies 30. The main body 41 has a plurality of screw holes 44 and is positioned to one of the end faces 21 of the slider 20 through insertion of the screws 60 into the screw holes 44. The protruding tube 42 of each circulating device 40 extends into one of the enlarged portions 223 of one of the tube-receiving channels 22. The circulating hole 43 has a turning section 431 in a U-shaped form disposed within the main body 41, and a coupling section 432 disposed within the protruding tube 42 and enlarger in cross section than the turning section 431. The turning section 431 and the coupling section 432 are connected to each other at a junction that forms a shoulder face 433. In this embodiment, each circulating device 40 further includes a positioning block 434 projecting from the shoulder face 433. The coupling section 432 has an inner cross sectional profile similar to a cross sectional profile of the outer surrounding surface 33 of the tubular lubricant body 30. The circulating devices 40 of each pair are opposite to each other along the longitudinal line (X) and cooperate with one of the tubular lubricant bodies 30 and one of the second roller passage holes (S) to define a circulating circuit (C).

The circulating circuit (c) receives one of the roller units 50 to circulate therein.

As shown in FIGS. 1, 3, 4, 5A and 6, in assembly, the circulating devices 40 are secured to the slider 20 by the screws 60. Each tubular lubricant body 30 extends into the respective tube receiving-channel 22 and the coupling section 432 of the respective circulating device 40. Because the cross sectional profile of the outer surrounding surface 33 of each tubular lubricant body 30 is similar to the inner cross sectional profile of the coupling section 432, the axially opposite end portions 340 are respectively and non-rotatably inserted into the coupling sections 432 of the circulating holes 43 of one pair of the circulating devices 40 to prevent rotation of the respective tubular lubricant body 30. Further, the engagement recesses 35 of each of the tubular lubricant bodies 30 respectively engage with the positioning blocks 434 of one pair of the circulating devices 40. The tubular lubricant bodies 30 are positioned in the slider 20 along the axis (L), and the lubricant supply holes 36 of the tubular lubricant bodies 30 are fluidly communicated with the lubricant-filling channel 24 of the slider 20.

When lubricant oil is injected into the lubricant-filling channel 24, the lubricant oil flows into the tube-receiving channels 22 of the slider 20 and fills the outer lubricant-storing recesses 333 of the tubular lubricant bodies 30. Because each tubular lubricant body 30 is made of the porous material, the lubricant oil flows into the first roller passage holes 31 of the tubular lubricant bodies 30 and fills the inner lubricant-storing recesses 321. Therefore, circulation of the roller units 50 in the circulating circuit (C) is smooth, and lifetime of mechanical components is prolonged.

Aside from having the porous material capable of storing lubricant oil, the tubular lubricant bodies 30 are provided with the inner and outer lubricant-storing recesses 321, 333 which offer spaces to additionally store the lubricant oil. Therefore, each tubular lubricant body 30 can provide efficient retention of lubricant oil and hence a long-lasting lubrication effect, thereby reducing maintenance frequency and enhancing operation efficiencies.

The advantages of this disclosure can be summarized as the following:

1. The tubular lubricant bodies 30 prevent the roller units 50 from directly contacting the wall of the tube-receiving channels 22. Presence of the tubular lubricant bodies 30 inside the tube-receiving channels 22 avoids use of small size roller channels, which are inconvenient to be processed.

2. Because each tubular lubricant body 30 is thermo-formed from the high density polyethylene material and has a porous structure, each tubular lubricant body 30 can absorb and retain the lubricant oil. When the lubricant oil saturates the tubular lubricant body 30, the tubular lubricant body 30 continuously lubricates the respective roller unit 50 in the first roller passage hole 31 by releasing the lubricant oil therefrom.

3. The outer and inner surrounding surfaces 33, 32 of the tubular lubricant body 30 are non-circular in cross-section, and respectively have the outer lubricant-storing recess 333 and the inner lubricant-storing recesses 321. Since the lubricant supply hole 36 extends from one of the protrusion portions 331 to one of the inner lubricant-storing recesses 321, and an inner end of the lubricant supply hole 36 is situated in the respective inner lubricant-storing recess 321, an irregular edge possibly formed at the inner end will not affect smooth circulation of the roller unit 50.

When the roller unit 50 having a roller diameter of 4.7 mm is used in a tubular lubricant body with a conventional design of circular cross section and with a thickness of 1 mm, a lubricant storage area of the tubular lubricant body will be 5.609 mm$^2$. In contrast, in the embodiment of the disclosure, by virtue of the outer lubricant-storing recess 333 of the outer surrounding surface 33 and the inner lubricant-storing recesses 321 of the inner surrounding surface 32, a lubricant storage area of the tubular body 30 can be increased to 10.128 mm$^2$, which provides an increase in oil storage amount by 1.8 times. In addition, a clearance is formed between the tubular body 30 and the roller unit 50 such that a maximum lubricating effect can be achieved.

Because the protruding tube 42 has an inner cross sectional shape similar to an outer cross sectional shape of the tubular lubricant body 30, the tubular lubricant body 30 is prevented from rotating. Because the engagement recesses 35 of the tubular lubricant bodies 30 engage respectively with the positioning blocks 434 of the circulating devices 40, the lubricant supply holes 36 of the tubular lubricant bodies 30 can be assuredly aligned and communicated with the lubricant-filling channel 24 of the slider 20 during assembly. In addition, when the protruding tubes 42 of the circulating devices 40 are assembled, each tubular lubricant body 30 may be adjusted or corrected to absorb machining or dimensional errors of the tube-receiving channels 22 of the slider 20 and assembly tolerances of the circulating devices 40. Therefore, each rollers units 50 is allowed to circulate smoothly without encountering any stepped formations at the junctures of the tubular lubricant bodies 30 and the circulating devices 40.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A lubricating tube comprising:
    a tubular lubricant body made of a porous material and defining an axis, said tubular lubricant body including an inner surrounding surface surrounding the axis, and an outer surrounding surface surrounding said inner surrounding surface;
    said inner surrounding surface having a non-circular cross-section perpendicular to the axis, a plurality of angularly spaced-apart inner lubricant-storing recesses disposed around the axis and extending axially, and a plurality of guide surface portions each of which is interconnected between two adjacent ones of said inner lubricant-storing recesses, said inner lubricant-storing recesses and said guide surface portions constituting said inner surrounding surface and cooperatively defining a first roller passage hole;
    said inner lubricant-storing recesses being indented from said guide surface portions toward said outer surrounding surface;
    wherein said outer surrounding surface has a non-circular cross-section perpendicular to the axial line,
        a plurality of angularly spaced-apart protrusion portions disposed around the axial line and extending axially, and
        a plurality of arcuate surface portions each of which is interconnected between two adjacent ones of said protrusion portions;
    wherein said protrusion portions protrude outwardly from said arcuate surface portions, each of said arcuate surface portions and two adjacent ones of said protrusion portions cooperatively define an outer lubricant-storing recess; and wherein said tubular lubricant body further includes a lubricant supply hole extending through said inner and outer surrounding surfaces, and communicating with said first roller passage hole, said lubricant supply hole extending from one of said protrusion portions to one of said inner lubricant-storing recesses that is radially opposite to said one of said protrusion portions.

2. The lubricating tube as claimed in claim 1, wherein said tubular lubricant body is thermoformed from a high density polyethylene material.

3. A slide rail device, comprising:
a track member extending along a longitudinal line, and having two side walls opposite to each other along a transverse line transverse to the longitudinal line and two outer passage halves respectively indented into said side walls and extending along the longitudinal line;
a slider slidably disposed on said track member between said side walls, and including two end faces opposite to each other along the longitudinal line, two tube-receiving channels extending through said end faces along the longitudinal line, a lubricant-filling channel fluidly communicating with said tube-receiving channels, and two inner passage halves respectively confronting said outer passage halves to form second roller passage holes, each of said inner passage halves being disposed between one of said tube-receiving channels and one of said outer passage halves;
two tubular lubricant bodies made of a porous material, each defining an axis parallel with the longitudinal line and respectively disposed within said tube receiving-channels;
two pairs of circulating devices connected to said slider;
two roller units;
each of said tubular lubricant bodies including an inner surrounding surface surrounding the axis, and an outer surrounding surface surrounding said inner surrounding surface;
said inner surrounding surface having a non-circular cross-section perpendicular to the axis, a plurality of angularly spaced-apart inner lubricant-storing recesses disposed around the axis and extending axially, and a plurality of guide surface portions each of which is interconnected between two adjacent ones of said inner lubricant-storing recesses;
said inner lubricant-storing recesses and said guide surface portions constituting said inner surrounding surface and cooperatively defining a first roller passage hole;
said inner lubricant-storing recesses being indented from said guide surface portions toward said outer surrounding surface;
each of said circulating devices including a circulating hole communicating with one of said second roller passage hole and said first roller passage hole of one of said tubular lubricant bodies, said circulating devices of each pair being opposite to each other along the longitudinal line and cooperating with one of said tubular lubricant bodies and one of said second roller passage holes to define a circulating circuit; and
said circulating circuit receives one of said roller units.

4. The slide rail device as claimed in claim 3, wherein:
said outer surrounding surface of each of said tubular lubricant bodies has
a non-circular cross-section configuration perpendicular to the axial line,
a plurality of angularly spaced-apart protrusion portions disposed around the axial line and extending axially, and
a plurality of arcuate surface portions each of which is interconnected between two adjacent ones of said protrusion portions; and
said protrusion portions protrude outwardly from said arcuate surface portions, each of said arcuate surface portions and two adjacent ones of said protrusion portions cooperatively define an outer lubricant-storing recess.

5. The slide rail device as claimed in claim 4, wherein each of said tubular lubricant bodies further includes a lubricant supply hole extending through said inner and outer surrounding surfaces, and communicating with said first roller passage hole, said lubricant supply hole extending radially from one of said protrusion portions to one of said inner lubricant-storing recesses that is radially opposite to said one of said protrusion portions.

6. The slide rail device as claimed in claim 3, each of said tubular lubricant bodies is thermoformed from a high density polyethylene material.

7. The slide rail device as claimed in claim 3, wherein:
each of said circulating devices further includes a main body and a protruding tube projecting outwardly from said main body;
said circulating hole has a turning section disposed within said main body, and a coupling section disposed within said protruding tube and enlarger in cross section than said turning section, said turning section and said coupling section being connected to each other at a junction that forms a shoulder face, said coupling section having an inner cross sectional profile similar to a cross sectional profile of said outer surrounding surface of one of said tubular lubricant bodies;
each of said tubular lubricant bodies further includes two axially opposite end portions respectively and non-rotatably inserted into said coupling sections of said circulating holes of one pair of said circulating devices.

8. The slide rail device as claimed in claim 7, wherein each of said circulating devices further includes a positioning block projecting from said shoulder face, each of said end portions of each of said tubular lubricant bodies having an end face and an engagement recess indented into said end face, said engagement recesses of each of said tubular lubricant bodies respectively engaging with said positioning blocks of one pair of said circulating devices.

* * * * *